US006760745B1

(12) United States Patent
Tan et al.

(10) Patent No.: US 6,760,745 B1
(45) Date of Patent: Jul. 6, 2004

(54) WEB SERVER REPLICATED MINI-FILTER

(75) Inventors: Robert Tan, Los Altos, CA (US); Senthil Sundararajan, Sunnyvale, CA (US); PrabhuRam Mohan, San Jose, CA (US)

(73) Assignee: Aspect Communications Corporation, San Jose, CA (US)

( * ) Notice: Subject to any disclaimer, the term of this patent is extended or adjusted under 35 U.S.C. 154(b) by 0 days.

(21) Appl. No.: 09/572,016

(22) Filed: May 16, 2000

Related U.S. Application Data

(60) Provisional application No. 60/193,176, filed on Mar. 30, 2000.

(51) Int. Cl.[7] .............................................. G06F 15/16
(52) U.S. Cl. ......................... 709/203; 709/217; 715/513
(58) Field of Search ................................. 709/203, 217, 709/225, 226, 229, 246; 718/105; 715/513

(56) References Cited

U.S. PATENT DOCUMENTS

| | | | | |
|---|---|---|---|---|
| 5,867,706 A | * | 2/1999 | Martin et al. ................ | 709/105 |
| 6,035,119 A | * | 3/2000 | Massena et al. ............. | 717/100 |
| 6,185,598 B1 | * | 2/2001 | Farber et al. ................ | 709/200 |
| 6,226,642 B1 | * | 5/2001 | Beranek et al. .............. | 707/120 |
| 6,385,642 B1 | * | 5/2002 | Chlan et al. ................. | 709/203 |
| 6,397,259 B1 | * | 5/2002 | Lincke et al. ................ | 709/236 |
| 6,415,335 B1 | * | 7/2002 | Lowery et al. ................. | 710/5 |

* cited by examiner

Primary Examiner—Mehmet B. Geckil
(74) Attorney, Agent, or Firm—Blakely Sokoloff Taylor & Zafman LLP

(57) ABSTRACT

A method of operating a server includes retrieving a document from a storage device. A variable is generated, the variable including information to enable another server to reproduce the document. The variable may, for example, be a compressed and encrypted complete copy of the document, or may be a JavaScript variable. The variable is appended to the document, and the document is transmitted.

29 Claims, 11 Drawing Sheets

WEB SERVER REPLICATED MINI-FILTER

This application claims the benefit of Provisional application Ser. No. 60/193,176, filed Mar. 30, 2000.

FIELD OF THE INVENTION

The invention relates generally to the installation of software on a computer system. More specifically, the invention relates to a method of replicating customized web pages sourced from a replicated server configuration.

BACKGROUND OF THE INVENTION

The advent of the Internet and the World Wide Web has changed the manner in which many companies provide information and the customer service function to their clients and customers. Traditionally, a customer needing assistance or information with respect to a product or service provided by a company would call a customer service agent who would provide him the information over the phone and/or mail or fax the customer additional information as necessary. The web, however, has provided companies with another venue to provide customer service information to their customers. In many instances, a customer's problem or question is a common one that the customer can find an answer to by accessing the company's frequently asked questions web page. Many companies also provide up to date customer account information online so that the customer may access and review his account status in between receiving statements by mail.

In most instances, web based customer service has proven beneficial to customers and companies: the companies can be more efficient not requiring as many customer service personnel to spend time answering common questions; and the customers can quickly and easily find answers to the common questions by accessing the companies' web sites and accessing personal account information and other personal information online. However, in certain circumstances, a customer who has accessed a company's web site may have questions about information provided through the web site to which answers are not provided in a frequently-asked-questions page. For instance, the customer may have a question about his/her account statement. In this instance, the customer will typically have to call a customer service agent, explain to the customer service agent about the account information he/she was viewing, direct the customer service agent to the web page containing the account information, and direct the customer service agent to the portion of the page relating to his/her question. In many instances the customer will not have the ability to be online and converse with an agent at the same time, in which case explaining the content of the web page may be more difficult. The result may be a significant portion of time spent by the customer explaining the location and content of the information before the customer service agent is able to understand the customer's problem and help him/her.

Software programs have been developed that facilitate a customer and an agent to simultaneously view the same web page and interact with each other over the Internet. One such product is WebAgent software from Aspect Communications, Inc. Using the WebAgent software, a customer can browse web pages unassisted, but if assistance is needed, it can be requested by clicking a "help" button provided on the web page in question. The customer is then connected with a customer service representative. The customer service representative can concurrently view the same pages as the customer. The two parties can manipulate the concurrently viewed web pages, move from one page to another together, control each others navigation, markup the pages using a whiteboard feature, and chat with each other whether through IP telephony or through a text chat box.

Prior art FIG. 1 illustrates an architectural overview of an operating environment for utilizing the WebAgent software. A client computer 105 is connected to the Internet 110. A web server 15 is connected to the Internet 110. The web server 15 includes a cache 120 that can store requested and delivered pages and other information as necessary. The web server 115 is connected to a WebAgent server 125. The WebAgent server 125 is connected with a customer service representative's computer 130. The WebAgent server 125 is the server that handles the interaction between the customer's client computer 105 and the customer service representative's computer 130.

Prior art FIG. 2 provides a typical flow chart of the interaction between the client 105, the servers 115 & 125, and the customer service representative's computer 130 involved in establishing an interactive WebAgent session. In block 205, a client 105 requests a web page from a company's web server 115 through an Internet connection 110. The web page is retrieved by the web server 115 and sent to the client 105 in block 210. Where the web page is a dynamically-generated "post" type page, the page is customized for the client 105 and a copy is cached within the web server's cache 120 prior to sending the customized dynamically-generated page to the client 105. The requestor is then able to review the web page at his/her leisure on the client computer 105. If the requester, however, desires help or assistance in interpreting the page or in the case of a form, filling it out, the requestor may initiate a help session by clicking upon the appropriate icon on the web page as shown in block 215. In block 220, the request is retrieved by the WebAgent server 125, which initiates the sending of java applets to the client 105 necessary for the client 105 to participate in the interactive session. The java applets may be sent to the client 105 from either the web server 115, or the WebAgent server 125. In some implementations, a single server may perform the functions of both the web agent server 115 and the WebAgent server 125. Additionally, where the web page is of the "post" type, the WebAgent server 125 retrieves the copy of the web page stored in the cache 120. In block 225, the WebAgent server 225 contacts an available customer service representative's computer 130 and sends the customer service representative's computer 130 the copy of the web page. The customer service client 130 and the client 105 engage in an interactive session through the WebAgent 125.

In recent years with the rapid increase in the number of people using the World Wide Web, many organizations have found it necessary to have more than one server to meet the demand of people requesting to access their web sites. Accordingly, replicated web server architectures have become common where a number of servers, each having stored content identical as the other servers are interconnected with a load balancing server that receives and routes requests for web pages to the servers for servicing. Typically, the load-balancing server routes the request to the server that is carrying the lowest amount of current load.

The system of caching the "post" type dynamically-generated web pages as described above to establish an interactive session does not work well with replicated server architectures. The WebAgent server 125, after receiving a help request from the client 105, is unaware which of the multiple replicated servers was the source of the "post" type dynamically-generated page for which help is desired.

Accordingly, the WebAgent server 125 is not able to retrieve the copy of the cached dynamically-generated page stored in the server, which originally serviced the web page request, and send that page to the customer service representative's to establish the interactive session.

The same replicated server problem does not present itself when establishing an interactive help session with regard to static web pages or "get" type dynamically-generated web pages since the content of these types of pages are identified by the content of their URL and can, therefore, be retrieved from any of the replicated servers. Static pages are limited in terms of content to that which is stored on the server for that particular URL, and is therefore not particularly useful to generate customer specific web pages such as those that display account information.

"Get" type dynamically-generated pages are more useful in generating customer specific web pages. They are generated from a specific URL in which the information regarding the client user requesting the page, such as passwords and ID's are appended to the end of the requested URL when sent to the server. The server then running a script such as a CGI (Common Gateway Interface) script generates the web page. Accordingly, the WebAgent server 125 can retrieve the identical web page from any one of the replicated servers using the URL to generate the page. Certain operating environments cannot process URLs larger than a specified size, 1 kilobyte in many cases; therefore, the amount of data that may be requested in a "get" type dynamically-generated page is limited.

In a request for a "post" type dynamically-generated page, the generic URL is sent separately from the client user specific information. The server retrieves the URL and then runs a script to add the client specific data prior to locally caching and sending the page to the client 105. The WebAgent server 125 after receiving the help request from the client 105 cannot use the URL provided with the help request to generate the dynamically-generated page on the customer service representative's computer 130, because it has no mechanism with which to identify which of the many servers in a replicated environment has cached the dynamically-generated page, nor does it have enough information to regenerate the page on another server. The "post" type dynamically-generated page is, however, the preferred type of dynamically-generated page since the requests for such a page is not limited in size and complex and lengthy requests for customized dynamically-generated pages can be generated. This is preferred in situations where there is likely to be a large amount of client unique information within a page, such as account statements, and invoices.

SUMMARY OF THE INVENTION

A method for operating a server is described along with a claim for a server according to one aspect of the invention. The server retrieves a document from a data storage device, typically resident on the server. The server executing a filtering routine generates a variable, comprising information necessary for another server to reproduce the document. The filter routine appends the variable to the document, and the server transmits the document through a network connection to a client computer.

In variations of this aspect of the invention, the retrieved document is customized based on information provided by a requesting party to create a dynamically-generated document. Typically, the document is written in a markup language such as HTML. The variable may comprise an entire copy of the data and information from the dynamically-generated document, preferably in a compressed and encrypted format.

A method for operating a server receiving the variable is also described. The server receives the variable, typically from a client computer that is requesting to establish an interactive session with another client computer. The server uses the variable to replicate the document associated with the information contained within the variable. The document is then transmitted to the other client computer.

In variations of this aspect of the invention, the server caches the replicated document before or after sending a copy to the other client computer. Additionally, the server may add applets to the replicated document to assist in the operation of the interactive session and transmit the applet-endowed document back to the client to replace the version of the document on the client computer without the applets.

A method of operating a client computer displaying a document containing the variable is also described according to another aspect of the invention. A dynamically-generated document is received from the server. The client renders the document on its display. The displayed document includes a hypertext link or icon that may be selected to transmit the variable to an associated server. In variations of this aspect of the invention, the selection of the icon or link may be in order to initiate an interactive session with another client or server computer.

A server system is also described that may implement the server related methods in another aspect of the invention. The server system may consist of a single document server and another server to replicate the document associated with the variable and in certain embodiments establish and run an interactive session. In other embodiments, the server system may consist of multiple replicated document servers coupled with a load-balancing server to distribute requests among the document servers, each document server being able to retrieve and generate requested documents and run a filtering routine to append the variable to the documents prior to transmission. Additionally, the replicated server system would include the server tasked with replicating the document associated with a variable and in certain instances, establishing an interactive session between two client computers.

Other features and embodiments of the invention will become apparent to one skilled in the art from the accompanying drawings and detailed description that follows.

BRIEF DESCRIPTION OF THE DRAWINGS

The appended claims set forth the features of the invention with particularity. The invention is illustrated by way of example, and not by way of limitation, from the following detailed description taken in conjunction with the accompanying drawings of which:

DETAILED DESCRIPTION OF THE PREFERRED EMBODIMENT

Figure 1:
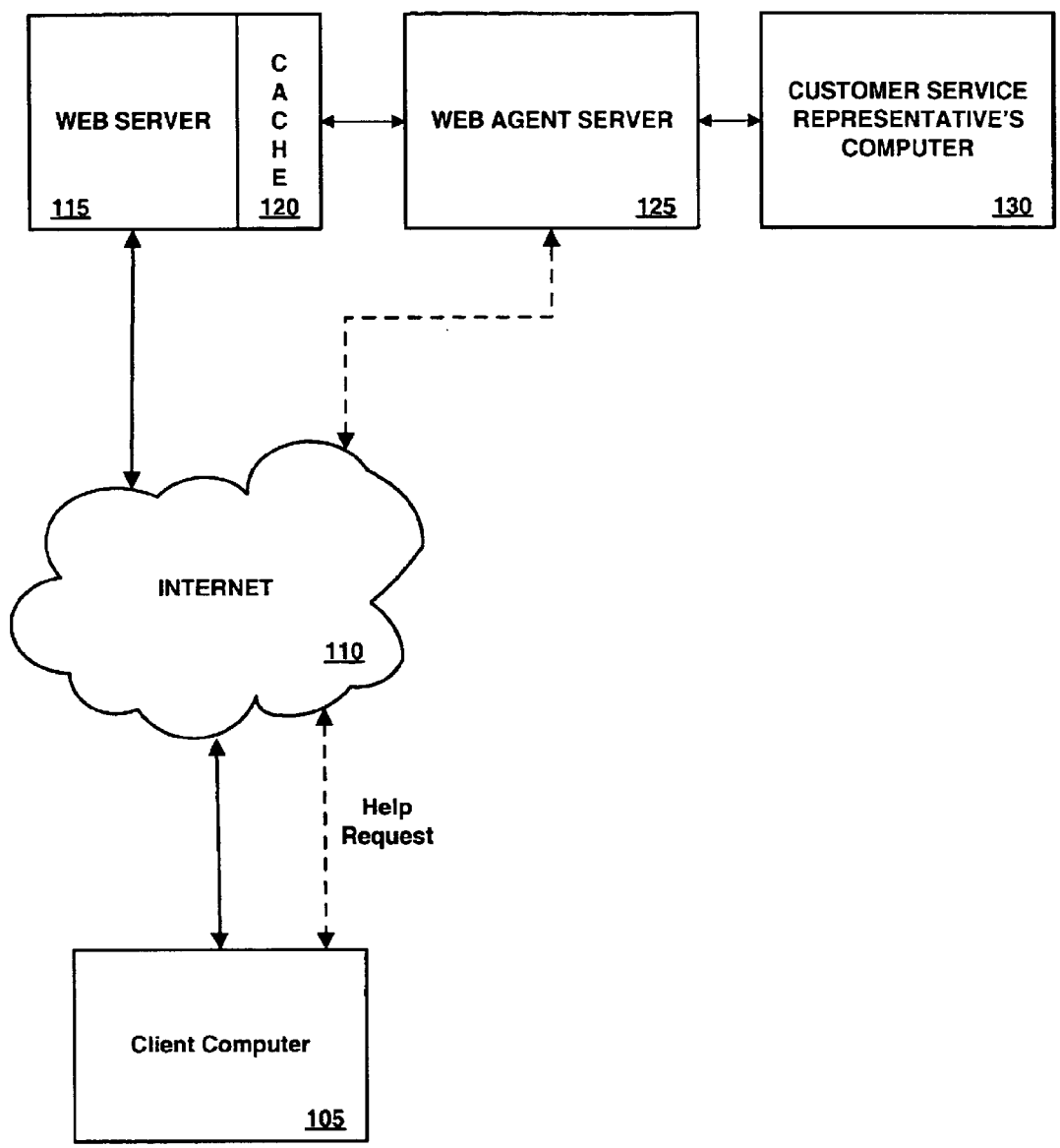
FIG. 1 is a block diagram of prior art architecture of an interactive client/customer service representative web environment that may be implemented using Aspect Communications, Inc.'s WebAgent software.
Figure 2:
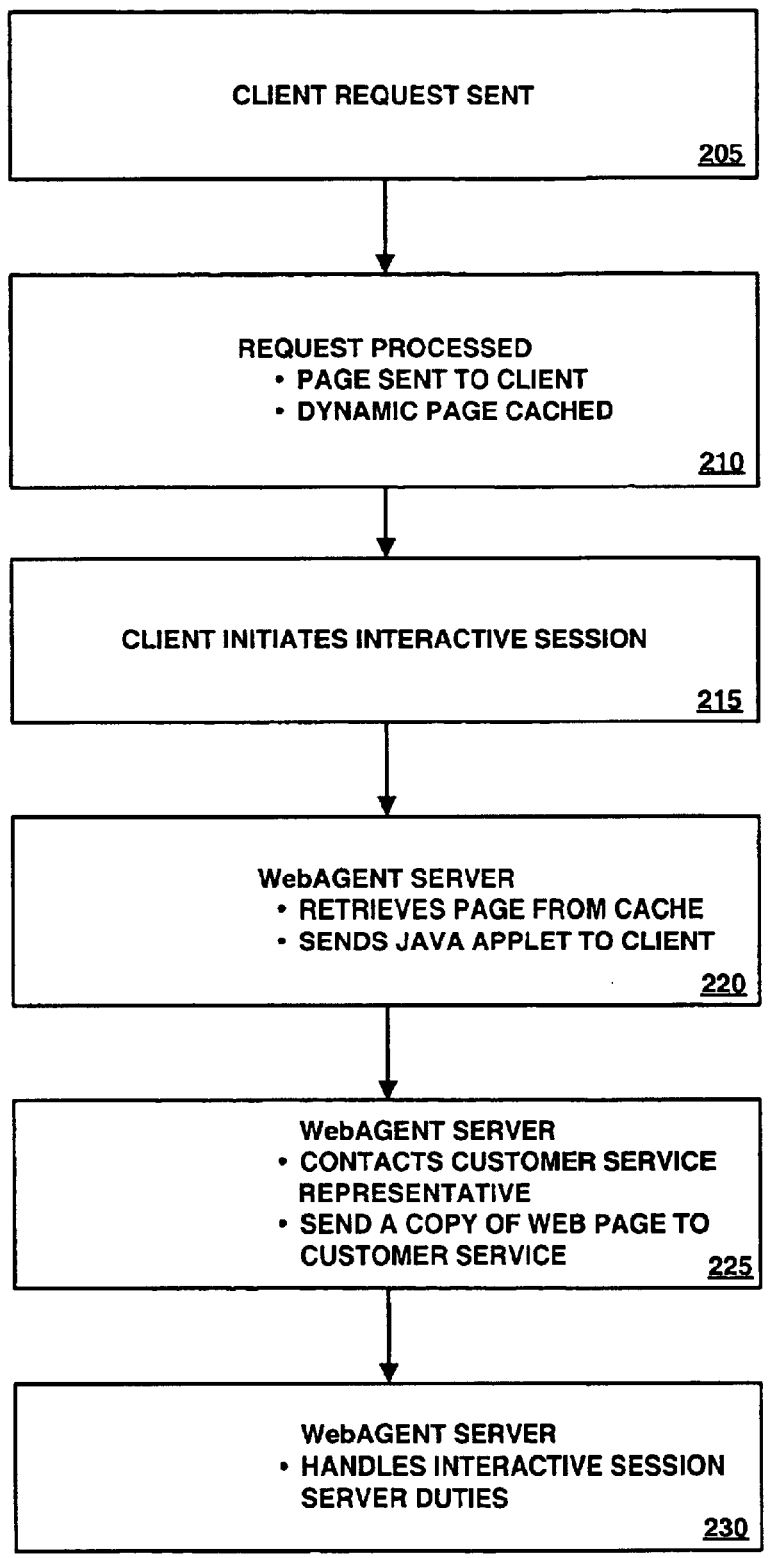
FIG. 2 is a flow diagram of a prior art method of establishing a interactive client/customer service representative web environment, such that may be implemented suing Aspect Communications, Inc.'s WebAgent software.

A method and system whereby facilitating an interactive session between two or more computers is described. In particular, by attaching to a dynamically-generated document generated by a document server a variable containing information necessary to replicate the document on another server, the other server will be able to generate a replicated version of the document to be sent to a second client computer in the establishment of a interactive session between two or more client computers. The variable is especially advantageous in situations were the document being replicated is dynamically-generated, wherein the document was customized by the document server prior to transmission to the client computer. Where the "push" method of creating a dynamically-generated document is used, the other server is not able to retrieve an exact copy of a dynamically-generated document from a URL alone. In a preferred embodiment, however, the entire customized dynamically-generated document is contained within the variable and customized document need not be retrieved from the sourcing server.

The invention is not limited to a single computing environment. Moreover, the architecture and functionality of the invention as taught herein and as would be understood by one skilled in the art is extensible to other types of computing environments and embodiments in keeping with the scope and spirit of the invention. The invention provides for various methods, computer-readable mediums containing computer-executable instructions, and apparatus. With this in mind, the embodiments discussed herein should not be taken as limiting the scope of the invention; rather, the invention contemplates all embodiments as may come within the scope of the appended claims.

The present invention includes various operations, which will be described below. The operations, may be performed by hard-wired hardware, or may be embodied in machine-executable instructions that may be used to cause a general purpose or special purpose processor, or logic circuits programmed with the instructions to perform the operations. Alternatively, the operations may be performed by any combination of hard-wired hardware, and software driven hardware.

The present invention may be provided as a computer program product that may include a machine-readable medium, stored thereon instructions, which may be used to program a computer (or other programmable devices) to perform a series of operations according to the present invention. The machine-readable medium may include, but is not limited to, floppy diskettes, optical disks, CD-ROM's, DVD's, magno-optical disks, ROM's, RAM's, EPROM's, EEPROM's, hard drives, magnetic or optical cards, flash memory, or any other medium suitable for storing electronic instructions. Moreover, the present invention may also be downloaded as a computer software product, wherein the software may be transferred from a remote computer to a requesting computer by way of data signals embodied in a carrier wave or other propagation medium via a communication link (e.g. a modem or a network connection).

An Exemplary Computer System

Figure 3:
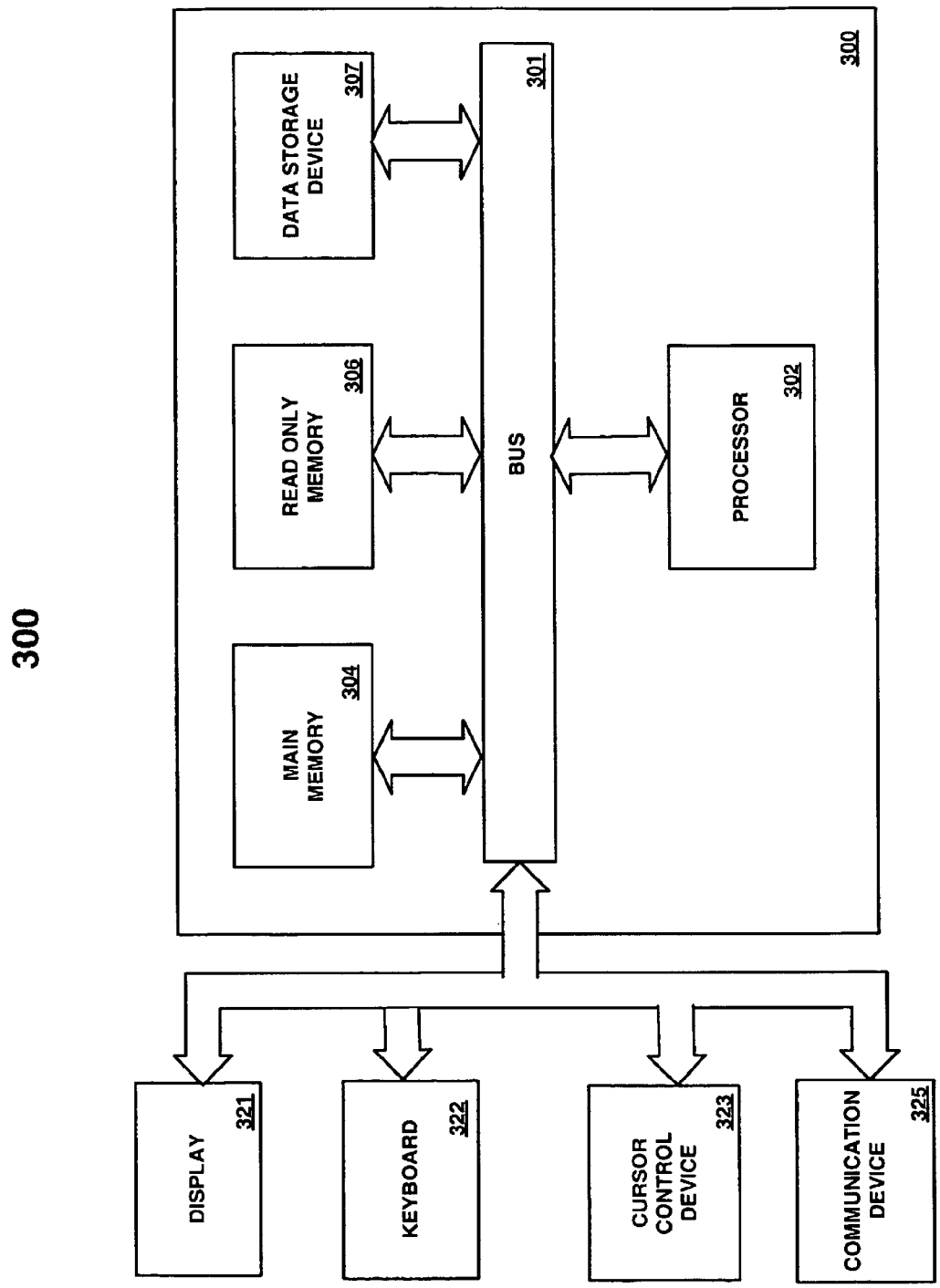
FIG. 3 is a block diagram of an exemplary computer system as may be utilized in embodiments of the invention.

FIG. 3 illustrates an exemplary computer system 300 upon which embodiments of the invention may be implemented. Computer system 300 comprises a bus or other communication means 301 for communicating information, and a processing means such as processor 302 coupled with bus 301 for processing information. Computer system 300 further comprises a random access memory (RAM) or other dynamically-generated storage device 304 (referred to as main memory), coupled to bus 301 for storing information and instructions to be executed by processor 302. Main memory 304 also may be used for storing temporary variables or other intermediate information during execution of instructions by processor 302. Computer system 300 also comprises a read only memory (ROM) and/or other static storage device 306 coupled to bus 301 for storing static information and instructions for processor 302.

A data storage device 307 such as a magnetic disk or optical disk and its corresponding drive may also be coupled to computer system 300 for storing information and instructions. Computer system 300 can also be coupled via bus 301 to a display device 321, such as a cathode ray tube (CRT) or Liquid Crystal Display (LCD), for displaying information to an end user. Typically, an alphanumeric input device (keyboard) 322, including alphanumeric and other keys, may be coupled to bus 301 for communicating information and/or command selections to processor 302. Another type of user input device is cursor control 323, such as a mouse, a trackball, or cursor direction keys for communicating direction information and command selections to processor 302 and for controlling cursor movement on display 321.

A communication device 325 is also coupled to bus 301. The communication device 325 may include a modem, a network interface card, or other well-known interface devices, such as those used for coupling to Ethernet, token ring, or other types of physical attachment for purposes of providing a communication link to support a local or wide area network, for example. In this manner, the computer system 300 may be coupled to a number of clients and/or servers via a conventional network infrastructure, such as a company's Intranet and/or the Internet, for example.

It is appreciated that a lesser or more equipped computer system than the example described above may be desirable for certain implementations. Therefore, the configuration of computer system 300 will vary from implementation to implementation depending upon numerous factors, such as price constraints, performance requirements, technological improvements, and/or other circumstances.

It should be noted that, while the operations described herein may be performed under the control of a programmed processor, such as processor 302, in alternative embodiments, the operations may be fully or partially implemented by any programmable or hard coded logic, such as Field Programmable Gate Arrays (FPGAs), TTL logic, or Application Specific Integrated Circuits (ASICs), for example. Additionally, the method of the present invention may be performed by any combination of programmed general-purpose computer components and/or custom hardware components. Therefore, nothing disclosed herein should be construed as limiting the present invention to a particular embodiment wherein the recited operations are performed by a specific combination of hardware components.

Exemplary Single Server Operating Architecture

Figure 4:
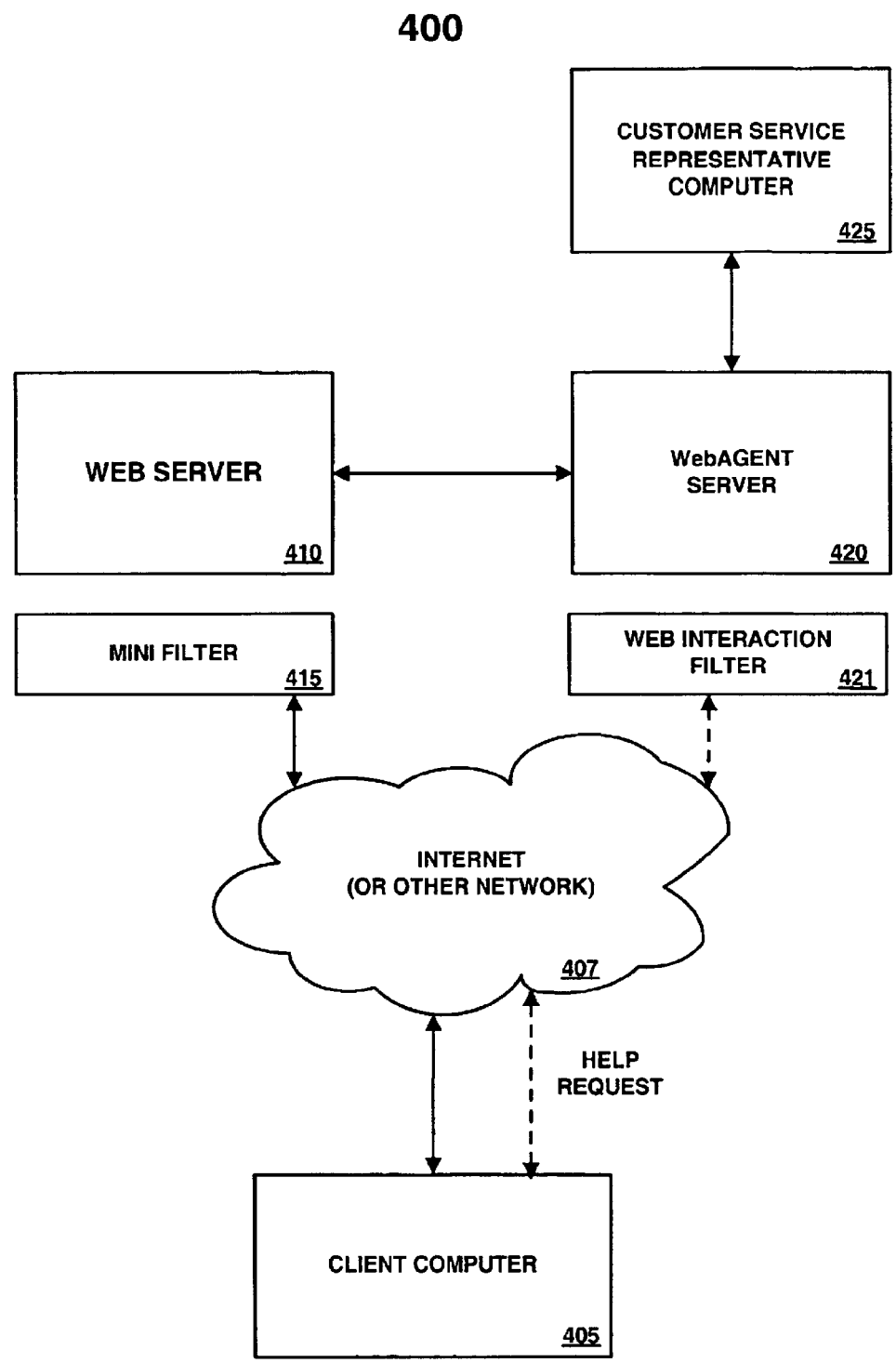
FIG. 4 illustrates an exemplary architecture for a single server embodiment of the invention.

FIG. 4 illustrates an exemplary architecture 400 for a single server embodiment of the invention. A client computer 405 is coupled to the Internet, an intranet or some other network via a network connection such as but not limited to a modem, a cable modem, or an Ethernet connection. Typically, the client 405 will be running a software application designed for communication over the network. In the exemplary embodiment, that software application would typically be a java enabled web browser such as Microsoft Internet Explorer, or Netscape Navigator that allows the client to receive and render HTML documents on its display 321. Alternative embodiments may employ different software applications to facilitate network communication or in certain instances a special software application may not be required, and the requisite code to initiate an interactive "help" session may be resident in a client's operating system.

Also coupled to the Internet, Intranet, or other network via a network connection is a web server 410. One of the primary functions of the web server 410 being to provide information to authorized users such as client 405. In the exemplary embodiment, the web server 410 is capable of generating "push" method type dynamically-generated customized HTML documents based on information received from a client 405. In operation, a client 405 may request certain client-specific web pages, such as, but not limited, to an account statement. The client's browser would transmit that request to the web server 410 in two parts; a first part being a URL to retrieve a generic (or non-customized) version of the HTML document from the web server's data storage device 307, and a variable (or data file) containing the necessary data for the web server 410 to customize the document prior to passing the document through a mini-filter 415 and sending it to the client 405. For example, a user of the client computer 405 might desire account information with regard to his stock brokerage account with an online trading company. On the brokerage's login web page, the user would enter his account number and his password. Next, he would send this information to the company's web server 410 by choosing the proper icon on the login web page. The web server 410 receives the URL and login information, retrieves the generic account information HTML document, performs a CGI script to add the user's account information related to the provided login information to the generic HTML document. The document is then sent to the client 405 through the mini-filter 415.

A mini-filter 415 is resident on the web server 410. Typically, the mini-filter 415 is a software application running on the web server 410, although in alternative embodiments the mini-filter 415 could be a hardware device that is part of or distinct from web server 410. The function of the mini-filter 415 is to append a JavaScript variable to the customized dynamically-generated HTML document prior to sending it to the client 405.

A WebAgent server 420 is coupled with the Internet or other network. The WebAgent server 420 and the web server 410 may be located on the same computer system as such that the single computer performs both web server 410 and WebAgent server 420 functions. Alternatively, the WebAgent server 420 can be a computer system distinct and separate from the web server 410, which may or may not be interconnected with the web server 410.

Typically, where the web server 410 and WebAgent server 420 are separate and distinct computer systems, the WebAgent server 420 and the web server 410 will have identical functionality, save for the addition of the Web Interaction Filter 421 software stored on the WebAgent server 420. In other words the WebAgent server 420 will have the same information and data stored on its data storage device 307 as on the web server 410, and/or the WebAgent server 420 will have access to the same databases as the web server 410. The replicated configuration of the WebAgent server 420 allows the WebAgent server 420 to more efficiently provide new HTML documents resident in its data storage 307 to the participants in an interactive "help" session. In alternative embodiments, the WebAgent server 420 may not have the same information or data stored within its data storage device 307 as the web server 410; however, if it is necessary for the interactive participants to be directed to a new HTML document stored within the web server 410 during an interactive session, the WebAgent server 420 will need to request and receive the new HTML document from the web server 410 prior to being able to provide it to the session participants.

At least one customer service representative computer 425 will be coupled with the WebAgent server 420. The coupling could be through a direct network connection or the coupling could be through an intranet or the Internet. The ability of the WebAgent server 420 to interconnect with at least two computers, a client computer 405 and a customer service representative's computer 425 in FIG. 4 facilitates the ability of the WebAgent server 420 to direct and control the interactive "help" session.

Exemplary Single Server Operation

Figure 5:
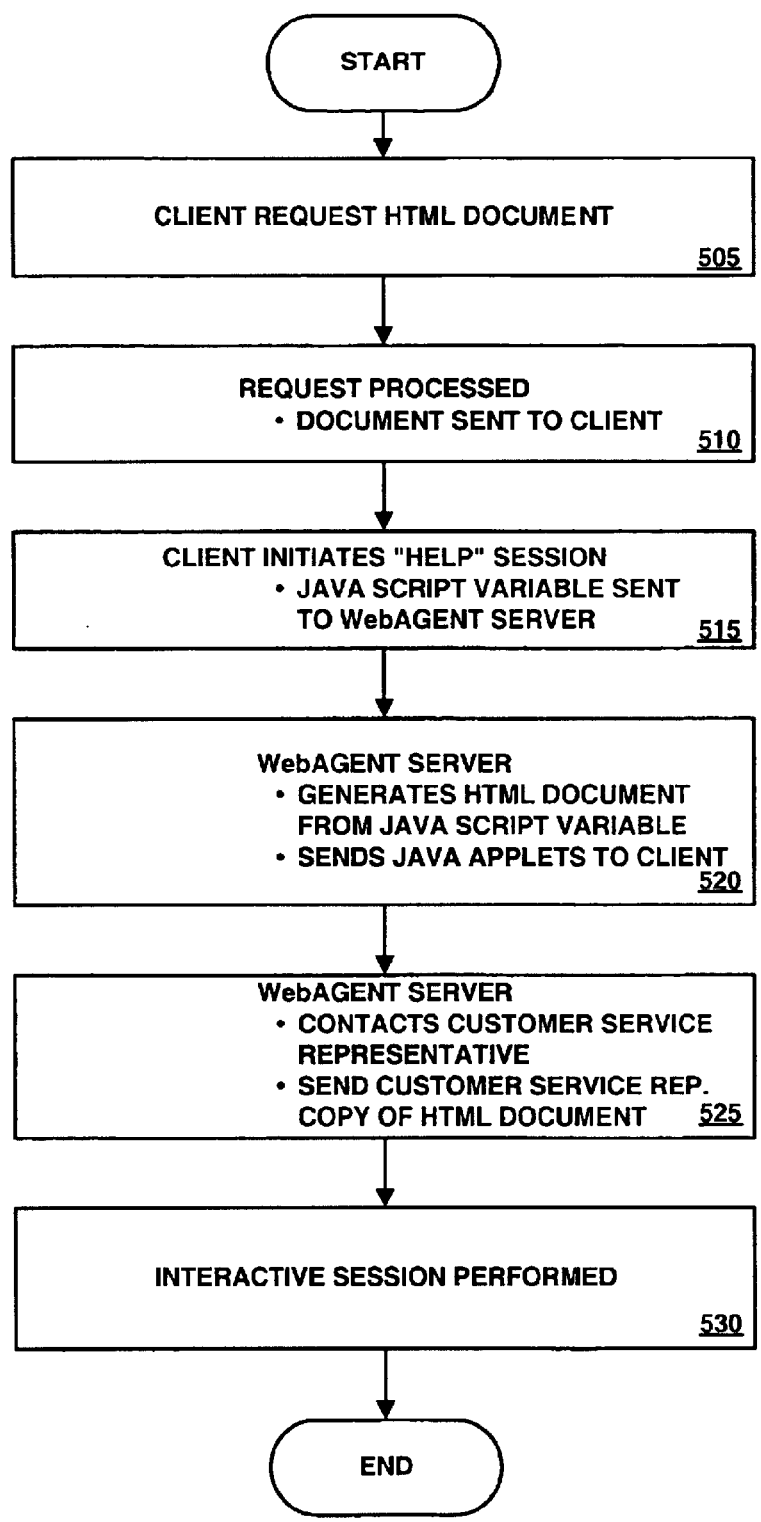
FIG. 5 is a flow chart illustrating the process involved in the initiation of an interactive session between a first and a second computer where a single server configuration as shown in FIG. 4 is utilized.

FIG. 5 is a flow chart illustrating the process involved in the initiation of an interactive session between a first and second computers where a single server configuration as shown in FIG. 4 is utilized. First, as shown in block 505, the user of the client computer 405 requests a "push" type dynamically-generated HTML document from a web server 410. Examples of customized HTML documents that may be requested by a user include, but are not limited to, account information, bank statements, invoices, medical records, and receipts. Typically, the request for a customized dynamically-generated HTML document requires the user of the client 405 to provide certain identifying information that the web server 410 can use to access the customization information necessary to generate the customized HTML document from the generic document retrieved by the web server 410 from its data storage device based on the provided URL. For example, the user will typically have to provide a user account ID and a password to access information about his/her brokerage account. Typically, the user will enter this information into a text box provided on a login web page, and next, the user will select an icon to submit the information and obtain access to his/her brokerage account data.

In block 510, the client's request for the customized dynamically-generated HTML document is received by the web server 410 after being transmitted over the Internet or other appropriate network. The web server 410 retrieves the generic HTML document from its data storage device 307 or from another database of information to which the web server 410 is connected. In the case of the brokerage account example, the account statement generic web page might include blank fields or placeholders for an account holder's name and address, the amount, the types, the values, and the names of securities the account holder possesses. The web server 410 will also run a script, typically a CGI script, in order to retrieve the appropriate information to populate the generic HTML document. Where the document is a "push" type, the information necessary to perform the CGI script is provided as a variable or data file by the client browser, which is sent to the web server 410 concurrently with the URL request. In the case of the brokerage account example, the variable would include the user's account ID and the user's password.

After the web server 410 generates the customized dynamically-generated HTML document, it is operated on by a mini-filter 415 typically installed on the web server 410, prior to being sent to the user's client computer 405. The mini-filter 415 appends a variable to the end of the dynamically-generated HTML document. In a preferred embodiment, the variable is a JavaScript variable and contains the entire contents of the dynamically-generated HTML document to which it is appended. The copy of the dynamically-generated HTML document contained within the variable may be compressed and/or encrypted by any number of conventional means. In alternative embodiments, the variable may be of the type useable by other programming languages other than Java. Furthermore, the variable may contain information other than the entire contents of the dynamically-generated HTML document. For instance, the variable could contain a Java applet that runs on the client computer 405 and causes the entire dynamically-generated HTML document resident on the client to be duplicated by the client computer 405 when executed. In another variation, the variable may contain only the data or information specific to the customization of the dynamically-generated HTML document and not the information contained within the generic portion of HTML document. Other variations in the data and information contained within the variable appended to the end of the dynamically-generated web page by the mini-filter 415 that are consistent with the claims presented herein are contemplated.

The client receives the customized dynamically-generated HTML document and the pages of the document are rendered on the client's display 321 for viewing by the user. Contained within the pages is a "help" icon, which may be selected by the user of the client computer 405 to initiate an interactive session with a customer service representative as indicated in block 515. When the interactive session is initiated, the JavaScript variable is included in the request sent to the WebAgent server 420.

In block 520, the WebAgent server 420 running the Web Interaction Filter 421receives the request for the interactive session and the JavaScript variable. The WebAgent server 420 then utilizes the JavaScript variable to generate a copy of the dynamically-generated HTML document from which the interactive session was initiated and caches the document locally. The HTML document copy created by the WebAgent server 420 may include additional java applets or other code in addition to the information contained in the JavaScript variable or the information and data as presented in the original copy as it was sent to the client computer 405. The purpose of the java applets being to perform functions related to the operation of the interactive session. In some embodiments, the java applets will add a chat box onto the client's display 321 desktop through which the client 405 and the customer service representative 425 will communicate during the interactive session. If the client 405 user has a preference to use VoIP (voice over internet) and the appropriate software and hardware is present on the client computer 405, an applet may be included in the HTML document copy to facilitate this type of communication between the parties to the interactive session. An applet may also be included that facilitates a white board option where the client user may use the mouse as a marker to mark up the dynamically-generated HTML document. Other applets to perform functions similar to those described in the Web Interaction 2000 v. 2.0 planning Guide, which is provided in Appendix B, may be included in the HTML document copy.

In a preferred embodiment, the copy of the HTML document with the added java applets is sent to the client's browser replacing the client's original version of the dynamically-generated HTML document. In alternative embodiments, the WebAgent server 420 may just send the java applets to the client computer 405 to be utilized in conjunction with the dynamically-generated HTML document already resident on the client computer 405.

Concurrently, with generating the HTML document copy or in close proximately therewith, the WebAgent server 420 contacts an available customer service representative computer 425. A copy of the dynamically-generated HTML document that was cached on the WebAgent server's data storage device 307 is sent to the customer service representative computer 425. The copy sent to the customer service representative computer 425 may or may not include the java applets sent to the client computer 405 depending on whether the requisite software to perform the desired interactive session functions are already installed on the customer service representative computer 425.

Finally, as represented by block 530, an interactive session is begun. In certain embodiments, all requests for web pages and markups to the currently displayed web pages are handled through the WebAgent server 420. For example, if the customer service representative wants to direct the client user to another web page containing additional information about the user's brokerage account, the customer service representative will select the URL in his browser and the WebAgent server 420 will receive the request and locate the related HTML document. If the document is available on the WebAgent server's data storage device 307, the WebAgent server 420 will retrieve it from the data device 307. If the HTML document is stored on another server connected to the Internet and/or other network, the WebAgent server 420 will retrieve the HTML document from the appropriate server. Once the HTML document has been received, the WebAgent server 420 sends the document to browsers on both the client computer 405 and the customer service representative computer 425. The user of the client computer 405 may also have the capability of directing new HTML documents to be displayed on both his client computer 405 and the customer service representative computer 425 in a similar manner.

Exemplary Replicated Server Architecture

Figure 6:
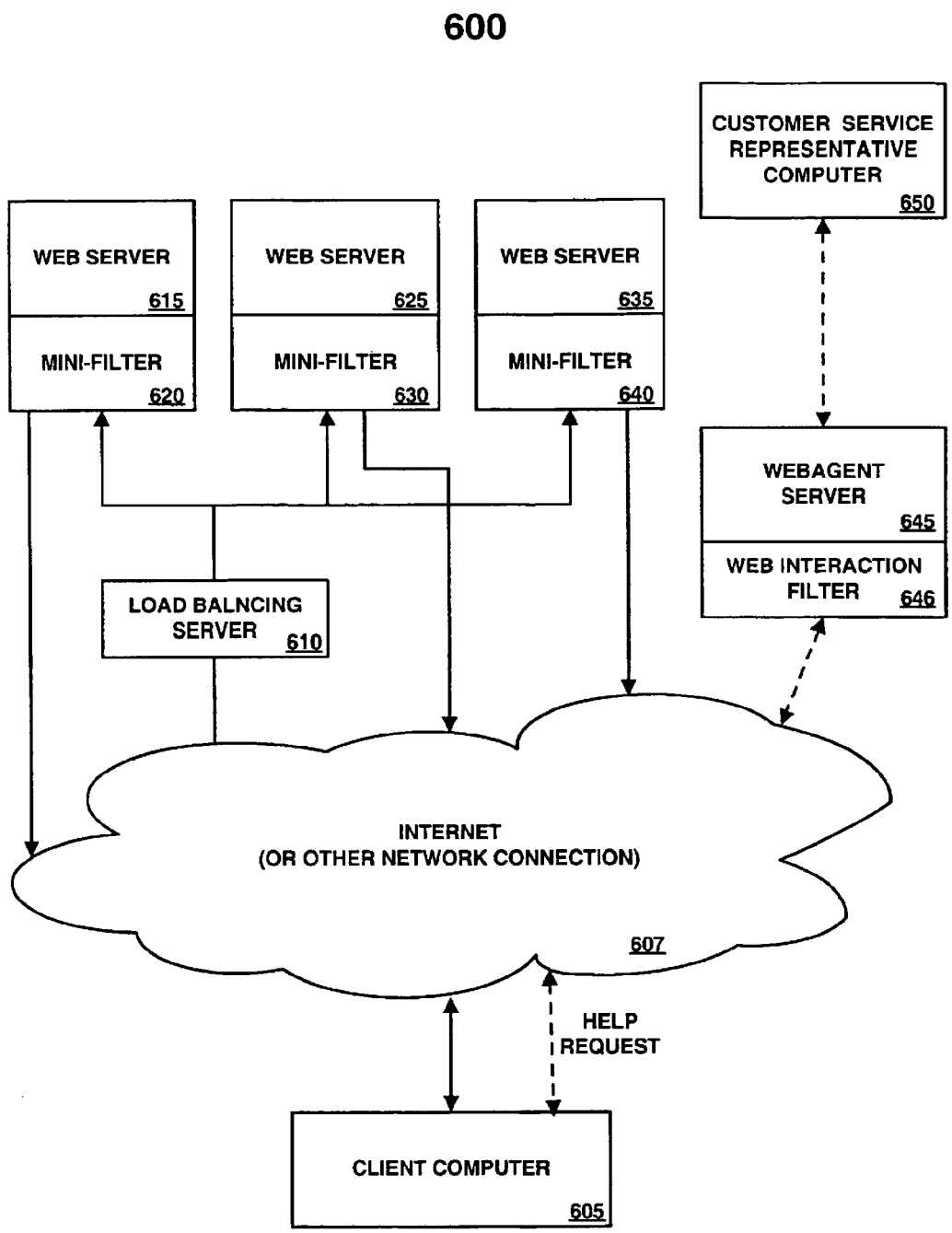
FIG. 6 illustrates an exemplary architecture 600 for a replicated server embodiment of the invention.

FIG. 6 illustrates an exemplary architecture 600 for a replicated server embodiment of the invention. A client computer 605 is coupled to the Internet, an intranet or some other network via a network connection such as but not limited to a modem, a cable modem, or an Ethernet connection. Typically, the client 605 will be running a software application designed for communication over the network. In an exemplary embodiments, the software application would typically be a java enabled web browser such a Microsoft Internet Explorer, or Netscape Navigator that allows the client computer 605 to receive and render HTML pages on its display 321. Alternative embodiments may employ different software applications to facilitate network communication or in certain instances a special software application may not be required and the requisite code to initiate an interactive "help" session may be resident in a client's operating system.

A load-balancing server 610 is coupled to the Internet, intranet, or other network via a network connection. The purpose of the load-balancing server 610 is to receive incoming requests and data intended for a particular domain and distribute the requests to the replicated web servers 615, 625 & 635 to which it is also coupled. Typically, the load balancing server 610 will track the traffic being handled by each web servers 615, 625 & 635 and direct the incoming requests and data to the web server with the lowest amount of traffic. Also coupled to the Internet, Intranet, or other network via a network connection are web servers 615, 620 & 635. Each of the web servers 615, 620 & 635 is a replicated version of the other such that each contain or have access to the same information and data, and each are capable of performing the same functions. One of the primary functions of the web servers 615, 620 & 635 is to provide information to authorized requestors such as client 605. Although incoming requests pass through the load-balancing server 610, the load-balancing server 610 is typically bypassed when transmitting information and data from the web servers 615, 625, & 635 to a client 605.

In an exemplary embodiment, the web servers 615, 625 & 635 are capable of generating "push" method type dynamically-generated customized HTML documents based on information received from a client 605. In operation, a client 605 may request certain client specific HTML documents, such as, but not limited to, an account statement. The client's browser would transmit that request to one of the web servers 615, 625 & 635 through the load balancing server 610 in two parts; a first part being a URL to retrieve a generic version of the HTML document from the web server's data storage device 307, and a variable (or data file) containing the necessary data for the web servers 615, 625 or 635 to customize the document prior to passing the document through a mini-filter 620, 630 or 640 and sending the document to the client 605. For example, a user of the client computer 605 might desire account information with regard to his stock brokerage account with an online trading company. On the login web page for the brokerage company, the user would enter his account number and his password. Next, he would send this information to the company's web server by choosing the proper icon on the login web page. The web server 615, 625 or 635 chosen by the load balancing server 610 receives the URL and login information, retrieves the generic account information web page, and performs a CGI script to add the user's account information to the generic web page based on the provided login information. The page is then sent to the client 605 through a mini-filter 620, 630 or 640.

Mini-filters 620, 630, & 640 are resident on or coupled with each web server 615, 625, & 635. Typically, the mini-filter filter 620, 630 or 640 is a software application running on the web servers 615, 625, & 635, although in alternative embodiments the mini-filters 620, 630, & 640 could be a hardware devices part of or distinct from the web servers 615, 625, & 635. The function of the mini-servers 620, 630, & 640 are to append a JavaScript variable to the customized dynamically-generated HTML document prior to sending it to the client 605.

A WebAgent server 645 is coupled with the Internet or other network. Typically, the WebAgent server 645 and the web servers 615, 625 & 635 will have identical functionality, save for the addition of a Web Interaction Filter 646 stored on the WebAgent server 645. In other words, the WebAgent server will have the same information and data stored on its data storage device 307 and the access to the same databases as the replicated web servers 615, 625 & 635. The replicated configuration of the WebAgent server 645 allows the WebAgent server 645 to more efficiently provide new HTML documents resident in its data storage 307 to the participants in an interactive "help" session. In alternative embodiments, the WebAgent server 645 may not have the same information or data stored within its data storage device 307 as the web servers 615, 625 & 635; however, if it is necessary for the interactive participants to be directed to a new HTML document stored within the web servers 615, 625 & 635 during an interactive session, the WebAgent server 645 will have to request and receive the new HTML document from the web servers 615, 625 & 635 prior to being able to provide it to the session participants.

At least one customer service representative computer 650 will be coupled to the WebAgent server 645. The coupling could be via a direct network connection or the coupling could be through an intranet or the Internet. The ability of the WebAgent server 645 to couple with at least two computers, a client computer 605 and a customer service representative computer 650 facilitates the ability of the WebAgent server 645 to direct and control the interactive "help" session.

Exemplary Server Operation

Figure 7:
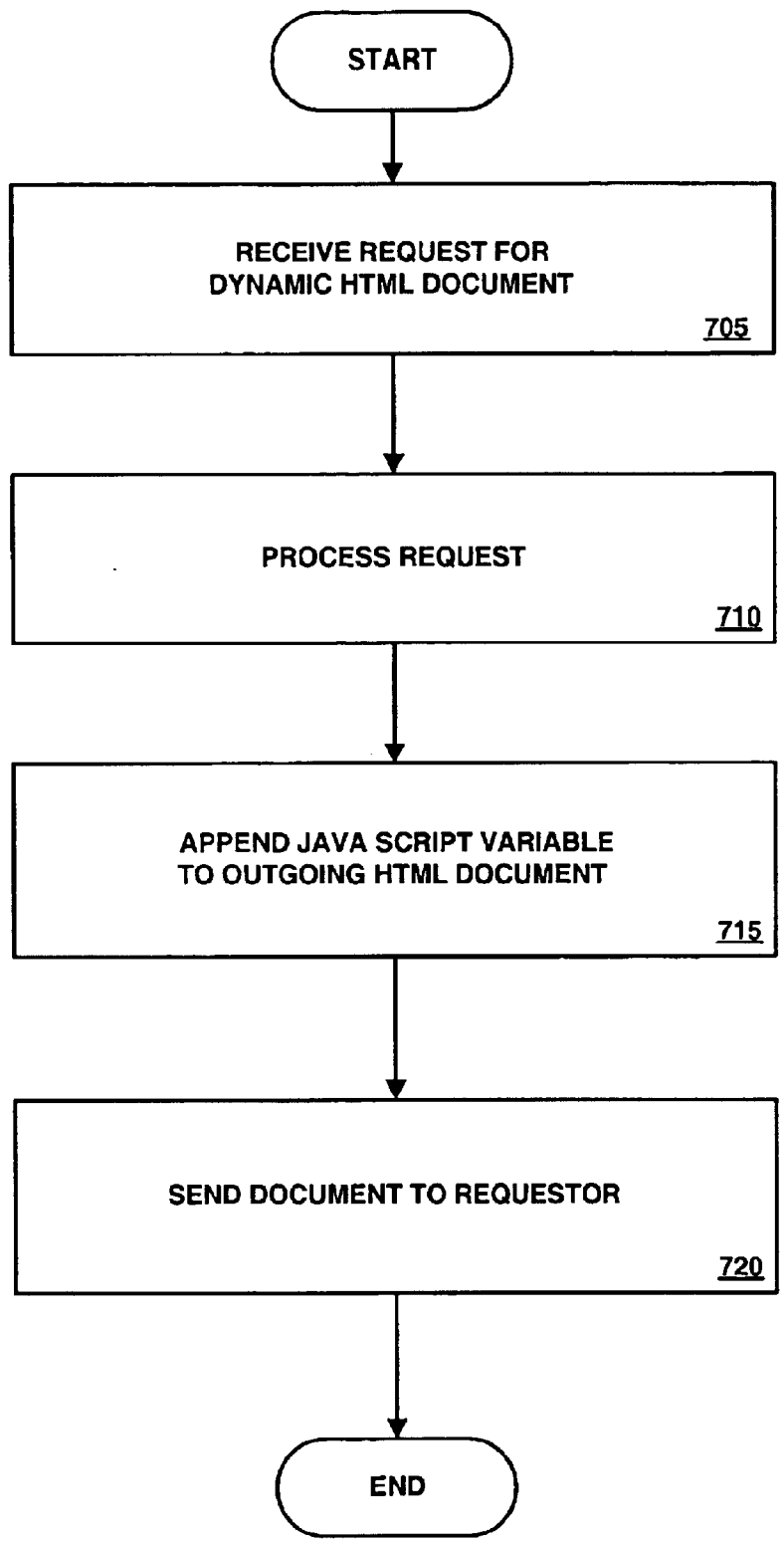
FIG. 7 is a flow chart illustrating the operations performed by an exemplary web server to initiate an interactive session between a first and a second computer.

FIG. 7 is a flow chart illustrating the operations performed by an exemplary web server to initiate an interactive session between a first and a second computer. The function performed by the exemplary web server is essentially the same whether the server is a stand alone unit, handling the entire load for a particular organization as illustrated in FIG. 4, it is one of several similar replicated servers as illustrated in FIG. 6, or any combination in between. The primary difference between the FIG. 4 server and the FIG. 6 replicated servers being that the FIG. 6 servers receive the request for a dynamically-generated HTML document through the load balancing server 610; whereas, the FIG. 4 server receives the request through the network from the client computer 405. The receipt of a request for the dynamically-generated HTML document is illustrated in block 705.

In block 710, the server processes the request by retrieving the generic HTML document from the server's data storage device 307 or an available database, as applicable. For instance, in certain embodiments incorporating a replicated server configuration, information and/or HTML documents may be stored in a shared database accessible by each replicated server. Next, the server retrieves the customization information necessary to populate the generic HTML document. Where the dynamically-generated HTML document to be customized is generated using the "push" method instead of the "get" method, a variable (or data file) provided with the request separate and distinct from the URL is utilized to determine what customization information is to be retrieved. A CGI script is typically executed on the server, to retrieve the customization information and to populate the generic HTML document, although other scripts written in a variety of programming languages may be used.

Once the dynamically-generated HTML document has been generated, an application referred to a mini-filter is employed to make a copy of all or part of the contents of the dynamically-generated HTML document as illustrated in block 715. The copy is then appended to the end of the dynamically-generated HTML document as a JavaScript variable. In alternative embodiments, only part of the dynamically-generated HTML document might be copied and appended to the dynamically-generated HTML document. For instance, in some embodiments only the customization data may be copied. In other embodiments, none of the dynamically-generated HTML document's contents may be copied; rather information necessary to for the WebAgent server to regenerate the dynamically-generated document may be provided in the appended JavaScript variable. For instance, the appended variable could contain the URL of the generic HTML document along with the variable (or data file) used to determine what customization information must be retrieved inn order to generate a duplicate of the dynamically-generated HTML document. Also, the appended variable could be in a form of a java applet that executes and makes a copy of the dynamically-generated HTML document to be sent to the WebAgent server when the "help" session icon is chosen on the displayed dynamically-generated HTML document. Furthermore, although the variable is a JavaScript variable in a preferred embodiment, the variable may be of any type and configuration consistent with the claims included herein.

Finally, in block 720, the customized dynamically-generated HTML document with the appended variable is sent to the client computer.

Exemplary Client Computer Operation

Figure 8:
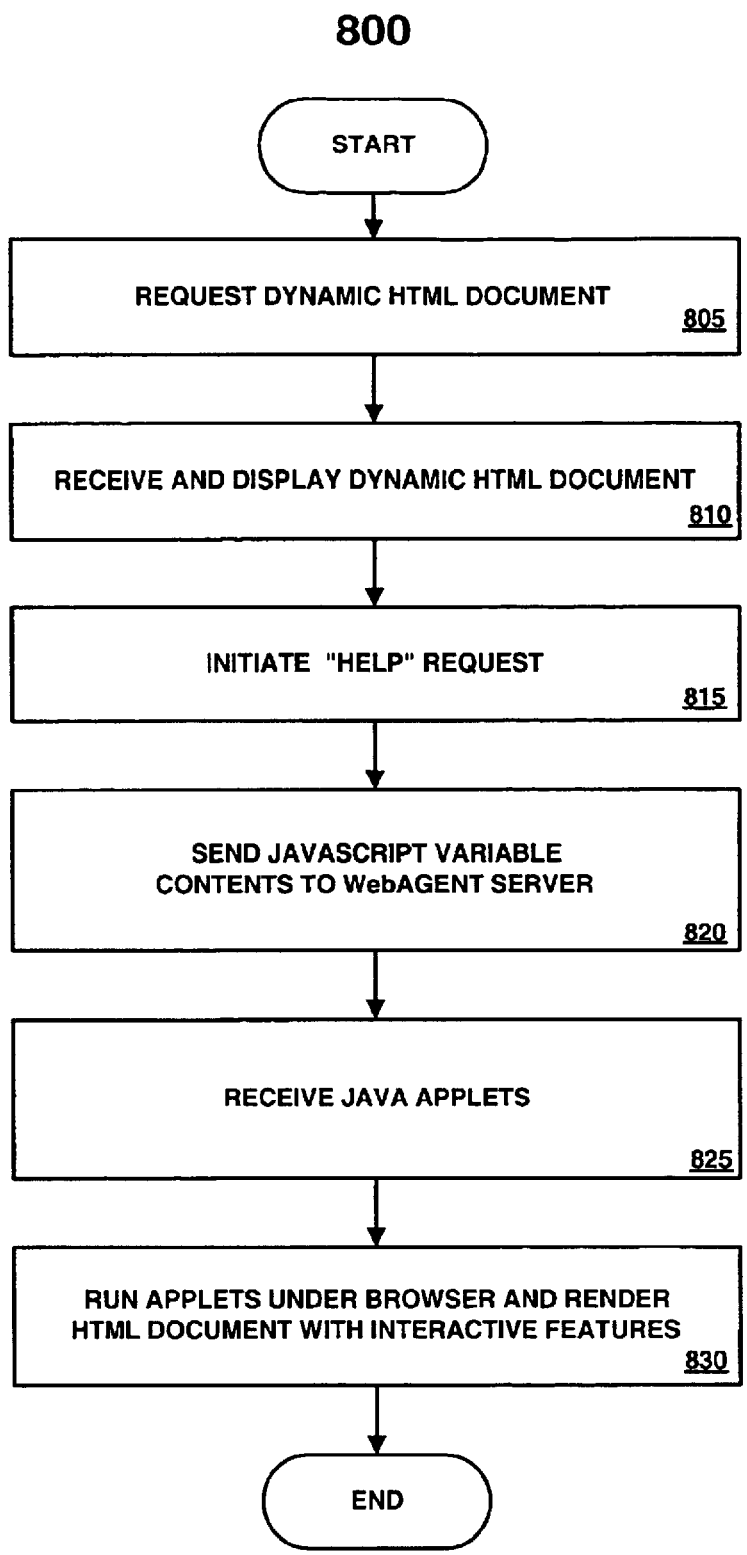
FIG. 8 illustrates the operations performed by the client computer in initiating an interactive "help" session between the client computer and another computer such as the customer service representative's computer.

FIG. 8 illustrates the operations performed by the client computer in initiating a interactive "help" session between the client computer and another computer such as the customer service representative's computer as illustrated in FIGS. 4 and 6. The operation of the client computer is the same whether a replicated server architecture of FIG. 6 or the single server architecture of FIG. 4 is utilized.

In block 805, the user of the client computer requests a dynamically-generated HTML document. Typically, the request will require the user to provide certain information specific to the nature of the HTML document he is requesting. For example, an ID and a password might have to be provided. In other instances, the information necessary to customize the HTML document may be provided by the browser of the client computer itself or by some third party application such as an Internet wallet. The request, comprising a URL for the generic document and an additional variable (or data file) containing the information necessary to retrieve the customization information is sent via the Internet to an appropriate server computer.

Figure 9:
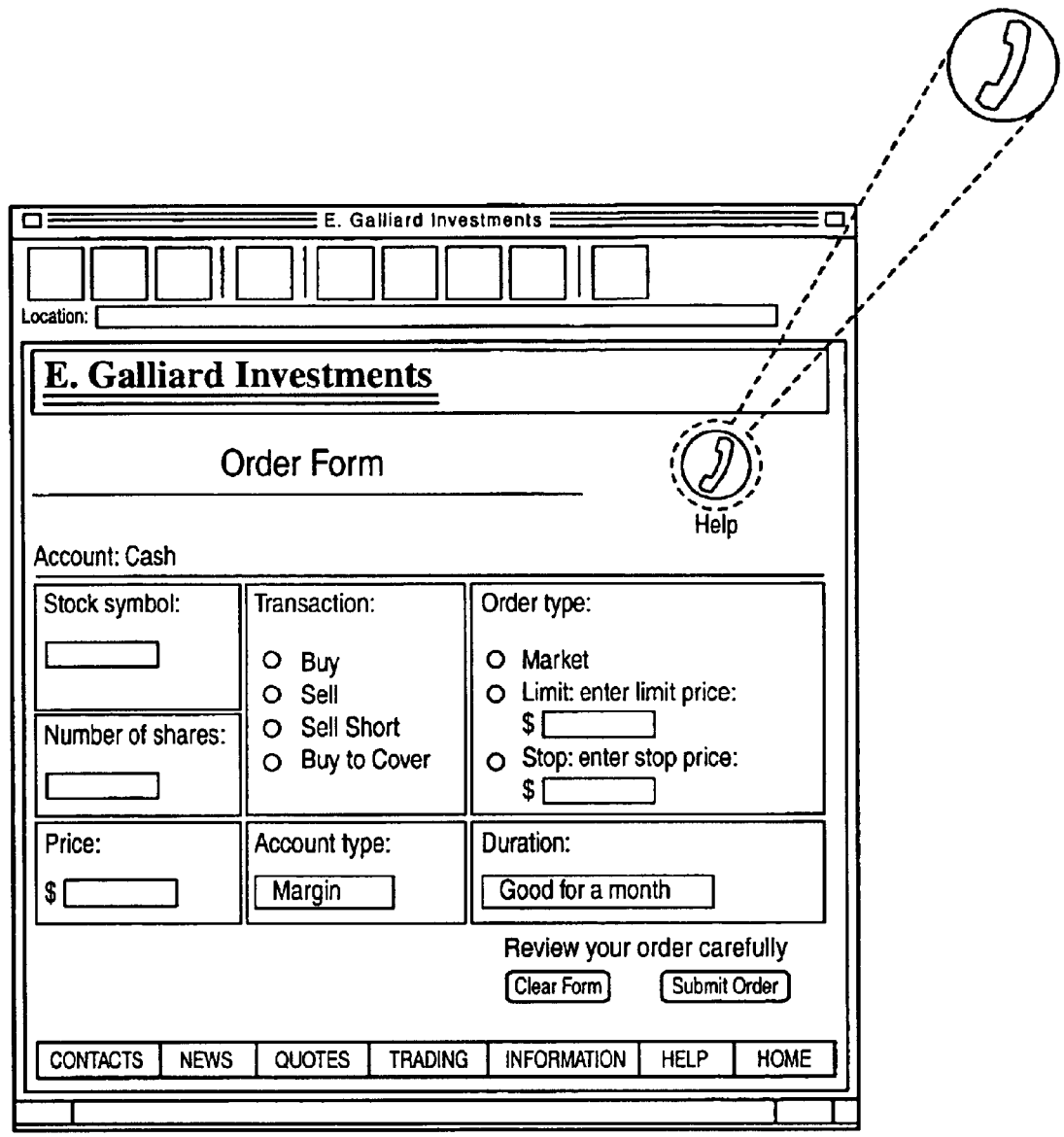
FIG. 9 is an illustration of an HTML document with a help button icon.

In block 810, after the server computer has generated the customized dynamically-generated HTML document and sent the HTML document to the client computer, the client computer renders and displays the information. The user can then review and utilize the information, as he/she desires. If the user has a question or requires more information than is provided on the displayed HTML document, the user can initiate an interactive "help" session with a customer service representative as illustrated in block 815. Typically, the interactive session is initiated by choosing an appropriate icon on the desktop of the displayed HTML document. An example of a displayed HTML document with a help button icon is illustrated in FIG. 9.

Figure 10:
FIG. 10 is an illustration of HTML document as received from the WebAgent server.

Once the "help" or together icon is selected to initiate the interactive session, the JavaScript variable is sent to the WebAgent server in block 820. Next, the WebAgent server will typically respond by sending the client a new copy of the dynamically-generated HTML document with a number of included java applets that facilitate communication between the customer service representative and the client user during the interactive session. For instance, there may be an applet received that renders and facilitates the operation of a chat box within the browser. A white board option may be provided in which the client user can use a mouse or other input device to mark-up the displayed dynamically-generated HTML document. An example of the applet-modified dynamically-generated HTML document as received from the WebAgent server is illustrated in FIG. 10. In alternative embodiments the applets or other applications may have been previously installed on the client computer to be executed when the "help" icon is selected; thereby, not requiring the applets or an enhanced copy of the dynamically-generated HTML document to be received from the WebAgent. For instance, the interactive session applications could be resident in the browser in the form of plug-ins. Once an indication is provided by the WebAgent that an interactive session has been established, the client user and the customer service representative can interact by sending chat or voice messages to each other, direct the browsing for each parties, and mark-up the displayed web pages to indicate to the other certain items of interest as illustrated in block 830.

Exemplary WebAgent Server Operation

Figure 11:
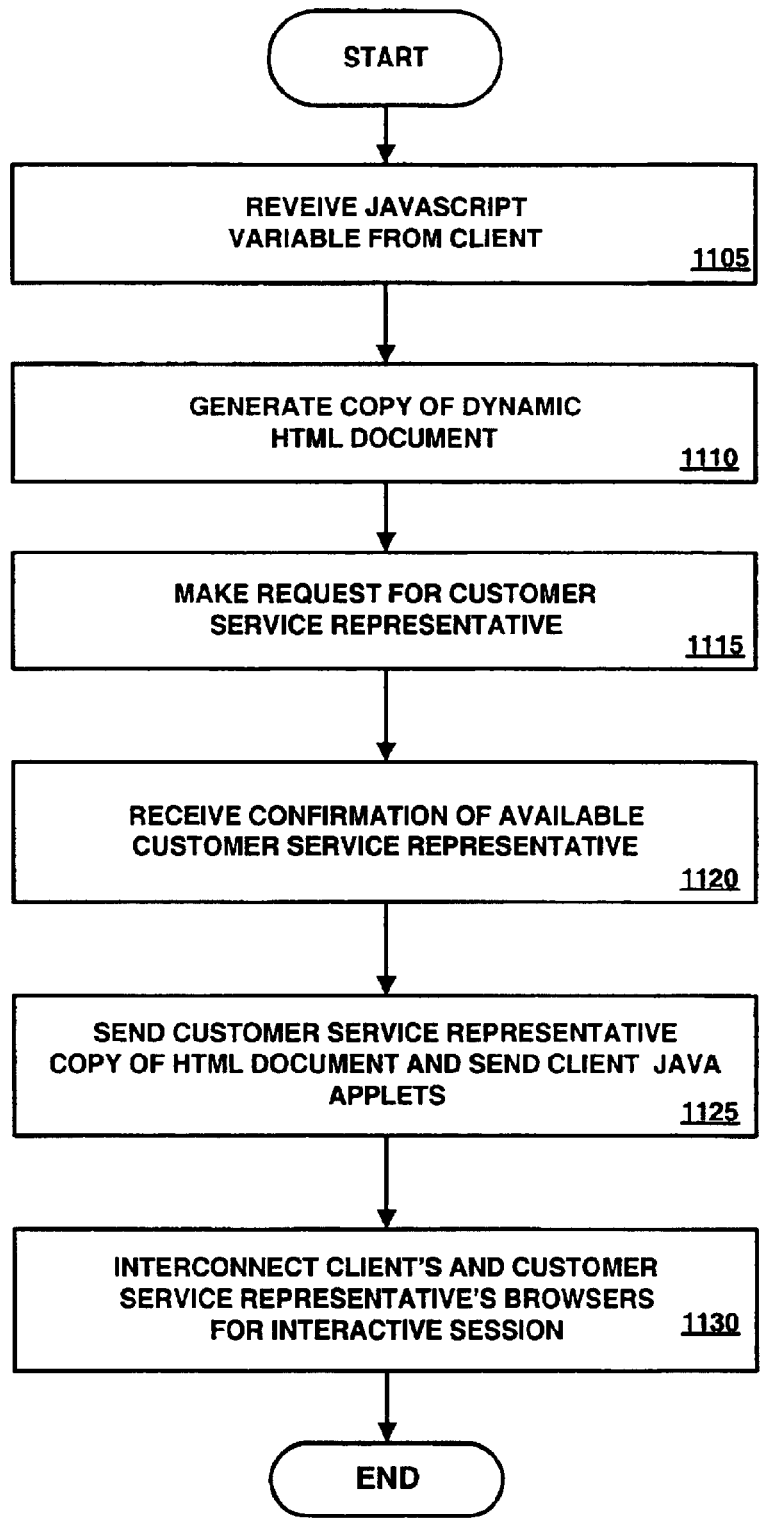
FIG. 11 illustrates the operations performed by the WebAgent server computer in initiating an interactive "help" session between the client computer and another computer.

FIG. 11 illustrates the operations performed by the WebAgent server computer in initiating a interactive "help" session between the client computer and another computer such as the customer service representative's computer as illustrated in FIGS. 4 and 6. The operation of the WebAgent server computer is essentially the same whether replicated server architecture of FIG. 6 or the single server architecture of FIG. 4 is utilized.

In block 1105, the WebAgent server receives the JavaScript variable form the client computer. Using that variable, the WebAgent server generates a copy of the dynamically-generated HTML document currently being viewed on the client computer as shown in block 1110. In a preferred embodiment, the JavaScript variable contains all the data and information contained in the dynamically-generated HTML document and the WebAgent server constructs a copy of the dynamically-generated HTML page using that information. In alternative embodiments, the JavaScript variable may contain the information necessary for the WebAgent server to construct the page using information stored within its data storage device 307 or information from an accessible database. The WebAgent server may cache the new copy of the dynamically-generated web page locally.

In block 1115, the WebAgent server makes a request for an available customer service representative computer to indicate it is available for an interactive "help" session. When and if a conformation is received as illustrated in block 1120, the WebAgent server sends a copy of the dynamically-generated HTML document to the customer service representative's computer for viewing during the interactive session as indicated by block 1125. Additionally, in block 1125, a modified copy of the HTML document may be sent to the client containing applets necessary for the client to participate in the interactive session. Once the dynamically-generated documents and applets have been provided as necessary to both the customer service representative and the client computer and interactive session may proceed, wherein all actions by the either party are passed through and handled by the WebAgent server as indicated by block 1130.

Alternative Embodiments

The Figures and the descriptions thereto discussed herein have related primarily to situations in which the interactive session is between a company service representative and a customer or client of the company. It is to be understood that the invention or embodiments thereof are not intended to be limited to only these types of interactive sessions. Embodiments of the invention have been considered where an interactive session may be established between any organization having information for distribution over a network and any party having a need to view and understand that information. Considered organizations include but are not limited to corporations, not-for-profit organizations, governmental agencies, and public assistance organizations. It is also conceived that embodiments of the invention may be utilized to establish interactive sessions between various persons in a gaming environment. Furthermore, although the embodiments have been discussed in terms of a "help" session between a user of a client computer and a customer service representative, they are not intended to be limited to only "help sessions" nor to interactive sessions between only two parties. It is conceivable that many computers may interact via a single WebAgent server on a single topic or issue.

The description has also related to the use of the invention primarily in the context of the Internet using web browsers and HTML documents. It is to be understood that embodiments of the invention are not limited with regard to any particular network environment or the applications used to communicate in that environment. Applications other than browsers may be utilized. Scripting languages other than HTML may be utilized, and other programming languages other than Java may be utilized. Furthermore, although the embodiments discussed herein refer primarily to "push" type dynamically-generated HTML documents, it is to be understood that the method, and systems described herein are also applicable to static and "get" type dynamically-generated HTML documents as well.

What is claimed is:

1. A method, comprising:
   receiving a request for a document from a client computer, the request including one or more identifiers having customization information to facilitate customization of the document;
   generating a variable based on the request received, the variable comprising the customization information and reproduction information to enable a replication server to reproduce the document as a customized document;
   identifying the replication server from a plurality of replication servers; and
   transmitting the variable to the replication server to reproduce the customized document.

2. The method of claim 1, wherein the variable comprises a JavaScript variable.

3. The method of claim 1, wherein the customized document comprises a markup language document.

4. The method of claim 1, further comprising:
   reproducing the customized document using the variable; and
   transmitting the customized document to the client computer.

5. The method of claim 1, wherein the request further includes a uniform resource locator (URL).

6. The method of claim 1, wherein the customized document includes tags to view an icon or hypertext when displayed on the client computer, the icon or hypertext, when activated, causing the variable to be sent to a another server computer.

7. A machine-readable medium having stored thereon data representing sets of instructions which, when executed by a machine, cause the machine to:
   receive a request for a document from a client computer, the request including one or more identifiers having customization information to facilitate customization of the document;
   generate a variable based on the request received, the variable comprising the customization information and reproduction information to facilitate a replication server to reproduce the document as a customized document;
   identify the replication server from a plurality of replication servers; and
   transmit the variable to the replication server to reproduce the customized document.

8. The machine-readable medium of claim 7, wherein the sets of instructions, when executed by the machine, further cause the machine to:
   reproduce the customized document using the variable; and
   transmit the customized document to the client computer.

9. The machine-readable medium of claim 7, wherein the request further includes a uniform resource locator (URL).

10. A method, comprising:
    receiving a request for a dynamically-generated document from a client computer, wherein the dynamically-generated document includes a customized document that is customized based on customization information contained in the request to allow the client computer to interact with a computer;
    generating a variable based on the request received, the variable comprising the customization information and reproduction information to enable a replication server to reproduce the dynamically-generated document;
    identifying the replication server from a plurality of replication servers; and
    transmitting the variable to the replication server to reproduce the dynamically-generated document.

11. The method of claim 10, wherein the dynamically-generated document includes tags necessary to view an icon or hypertext when displayed on the client computer, the icon or hypertext, when activated, causing the client computer to interact with the computer comprising another client computer including a customer service representative computer.

12. The method of claim 10, further comprising:
    retrieving a template for the dynamically-generated document from a storage device based on a uniform resource locator (URL);
    retrieving customization information from the storage device based on one or more identifiers;
    generating the dynamically-generated document with the customization information and the template; and
    transmitting the dynamically-generated document to the client computer.

13. The method of claim 12, further comprising transmitting the dynamically-generated document to another client computer.

14. A method, comprising:

receiving a variable from a server computer, the variable generated based on a request for a document received at the server computer from a first client computer, wherein the variable includes reproduction information and customization information to reproduce the document as a customized document to be displayed on the first client computer and a second client computer;

reproducing the customized document based on the variable; and transmitting the customized document to the first client computer and to the second client computer.

15. The method of claim 14, further comprising:

adding applets to the customized document, the applets to perform functions assisting in the operation of an interactive session between the first and second client computers, wherein the first and second client computers simultaneously display the customized document; and transmitting the customized document containing the applets to the first client computer and the second client computer.

16. The method of claim 14, wherein the customized document comprises a markup language document.

17. The method of claim 14, wherein the variable comprises a JavaScript variable.

18. The method of claim 15, further comprises facilitating an interactive session between the first client computer and the second client computer.

19. The method of claim 18, wherein the customized document comprises a markup language document and is simultaneously displayed on browsers running on the first client computer and the second client computer.

20. A machine-readable medium having stored thereon data representing sets of instructions which, when executed by a machine, cause the machine to:

receive a variable from a server computer, the variable generated based on a request for a document received at the server computer from a first client computer, wherein the variable includes reproduction information and customization information to reproduce the document as a customized document to be displayed on the first client computer and a second client computer;

reproduce the customized document based on the variable; and transmit the customized document to the first client computer and to the second client computer.

21. The machine-readable medium of claim 20, wherein the sets of instructions, when executed by the machine, further cause the machine to:

add applets to the customized document, the applets to perform functions assisting in the operation of an interactive session between the first and second client computers, wherein the first and second client computers simultaneously display the customized document; and transmit the customized document containing the applets to the first client computer and to the second client computer.

22. An apparatus, comprising:

a first server computer having a first processor, a first network connection coupled to the processor, one or more storage devices coupled to the first processor, the one or more storage devices having stored thereon a first server application and a first filter routine, the first server application when executed by the first processor, causing the first processor to receive a request for a document from a first client computer via the first network connection, the request including one or more identifiers having customization information to facilitate customization of the document, and the first filter routine when executed by the first processor, causing the first processor to generate a variable based on the request received, the variable comprising the customization information and reproduction information to enable a replication server to reproduce the document as a customized document, to identify the replication server from a plurality of replication servers, and to transmit the variable to the replication server to reproduce the customized document; and a second server computer coupled to the first server computer.

23. The apparatus of claim 22, wherein the second server computer comprises the replication server, the second server computer having a second processor, a second network connection coupled to the second processor to receive the variable from the first server computer and to couple the second server computer with the first server computer, and a second set of one or more storage devices coupled to the second processor, the second set of one or more storage devices having stored thereon a second server application and a second filter routine, the second server application when executed by the second processor to cause the second processor to reproduce the customized document based on the variable, and the second filter routine to transmit the customized document to the first client computer.

24. The apparatus of claim 23, wherein the second filter routine is further to transmit the customized document to a second client computer.

25. The apparatus of claim 23, wherein the second filter routine is further to add applets to the customized document, the applets to perform functions assisting in the operation of an interactive session between the first client computer and the second client computer when executed by at least one of the first processor and the second processor and to simultaneously display the customized document on the first and second client computers.

26. A system, comprising:

a first server computer having a first processor, a first network connection coupled to the first processor, and a first set of one or more storage devices coupled to the first processor, the first set of one or more storage devices having stored thereon first server application and a first filter routine, the first server application when executed by the first processor, causing the first processor to receive a request for a document from a first client computer via the first network connection, the request including one or more identifiers having customization information to facilitate customization of the document, and the first filter routine when executed by the first processor, causing the first processor to generate a variable based on the request received, the variable comprising the customization information and reproduction information to enable a replication server to replicate the document as a customized document, to identify the replication server from a plurality of replication servers, and to transmit the variable to the replication server to reproduced the customized document; and a second server computer comprising the replication server, the second server
computer having
a second processor,
a second network connection coupled to the second processor to receive the variable from the first server computer and to couple the second server computer with the first server computer, and
a second set of one or more storage devices coupled to the second processor,
the second set of one or more storage devices having stored thereon a second server application and a second filter routine,
the second server application when executed by the second processor to cause the second processor to reproduce the customized document based on the variable, and
the second filter routine to transmit the customized document to the first client computer.

27. The system of claim 26, wherein the second filter routine is further to transmit the customized document to a second client computer.

28. The system of claim 26, wherein the second filter routine is further to add applets to the customized document, the applets to perform functions assisting in the operation of an interactive session between the first client computer and the second client computer when executed by the first processor or the second processor.

29. The system of claim 26, further comprising a load balancing server coupled to the first server computer through a third network connection, the load balancing server to receive the request for the document from the first client computer, and to transmit the request to the first server computer based on the workload being handled by the first server computer.

* * * * *